United States Patent
Luczak et al.

(10) Patent No.: US 12,315,321 B2
(45) Date of Patent: May 27, 2025

(54) SYSTEM AND COMPUTER-IMPLEMENTED METHOD FOR RESPONDING TO A POTENTIAL OR ACTUAL VEHICLE THEFT

(71) Applicant: MOTOROLA SOLUTIONS, INC., Chicago, IL (US)

(72) Inventors: Lukasz Luczak, Skawina (PL); Alex Rivkin, Airport City (IL); Chung Yong Chong, Bayan Lepas (MY); Woei Chyuan Tan, Bayan Lepas (MY); Daniil Bredesku, Airport City (IL)

(73) Assignee: MOTOROLA SOLUTIONS INC., Chicago, IL (US)

( * ) Notice: Subject to any disclaimer, the term of this patent is extended or adjusted under 35 U.S.C. 154(b) by 104 days.

(21) Appl. No.: 18/490,092

(22) Filed: Oct. 19, 2023

(65) Prior Publication Data
US 2025/0131785 A1 Apr. 24, 2025

(51) Int. Cl.
*H04N 7/18* (2006.01)
*G06V 20/62* (2022.01)
*G06V 40/16* (2022.01)
*G07C 9/32* (2020.01)
*G08B 25/00* (2006.01)

(52) U.S. Cl.
CPC ............. *G07C 9/32* (2020.01); *G06V 20/625* (2022.01); *G06V 40/172* (2022.01); *G08B 25/00* (2013.01); *H04N 7/18* (2013.01); *G06V 2201/08* (2022.01)

(58) Field of Classification Search
CPC .......... H04N 7/18; G07C 9/32; G06V 40/172; G06V 20/625; G06V 2201/08; G08B 25/00
USPC ........................................................ 348/149
See application file for complete search history.

(56) References Cited

U.S. PATENT DOCUMENTS

| | | | | |
|---|---|---|---|---|
| 4,603,390 | A * | 7/1986 | Mehdipour | G07B 15/02 902/22 |
| 5,432,508 | A * | 7/1995 | Jackson | G08G 1/146 377/9 |
| 5,638,302 | A | 6/1997 | Gerber | |
| 7,391,319 | B1 | 6/2008 | Walker | |
| 8,005,267 | B2 * | 8/2011 | Chew | G08B 13/19697 348/148 |
| 10,726,718 | B1 * | 7/2020 | Lyles | G07B 15/02 |
| 11,462,065 | B1 * | 10/2022 | Ogram | G07C 9/00658 |
| 11,830,046 | B2 * | 11/2023 | Rosas-Maxemin | G06N 3/045 |
| 2018/0247103 | A1 * | 8/2018 | Hsu | G06F 21/00 |
| 2018/0268238 | A1 * | 9/2018 | Khan | G06V 10/751 |

(Continued)

FOREIGN PATENT DOCUMENTS

KR 20070106319 A 11/2007

*Primary Examiner* — Trang U Tran

(57) ABSTRACT

A system and computer-implemented method for responding to a potential or actual vehicle theft is disclosed. The system is installable within a parking facility that includes a fixed barrier structure around at least a portion of a perimeter of the parking facility to facilitate restriction of vehicle exit and entry to an at least one location where a respective at least one access-controlled gate or door is installed. The system also includes a camera that is configured to capture at least one image showing license plate characters of a license plate of a vehicle. A Field Of View (FOV) of the camera is arranged to include coverage of an area that is inside the parking facility and along a path leading to the at least one access-controlled gate or door.

18 Claims, 3 Drawing Sheets

(56) References Cited

U.S. PATENT DOCUMENTS

2020/0216017 A1 7/2020 Wassef et al.
2024/0412634 A1* 12/2024 Hwang ................ G06V 20/586

* cited by examiner

SYSTEM AND COMPUTER-IMPLEMENTED METHOD FOR RESPONDING TO A POTENTIAL OR ACTUAL VEHICLE THEFT

BACKGROUND

Vehicle-related thefts are among some of the more common offenses for which a police response is called for. Thefts of vehicles include thefts for joyriding, thefts for prolonged vehicle use, and thefts for export or "chopping" (disassembling vehicles for spare parts). Thefts often occur in places where vehicles are parked (for example, street parking, parkade parking, etcetera). Vehicles can be parked for long or short periods of time, and vehicle thefts can occur in both scenarios.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
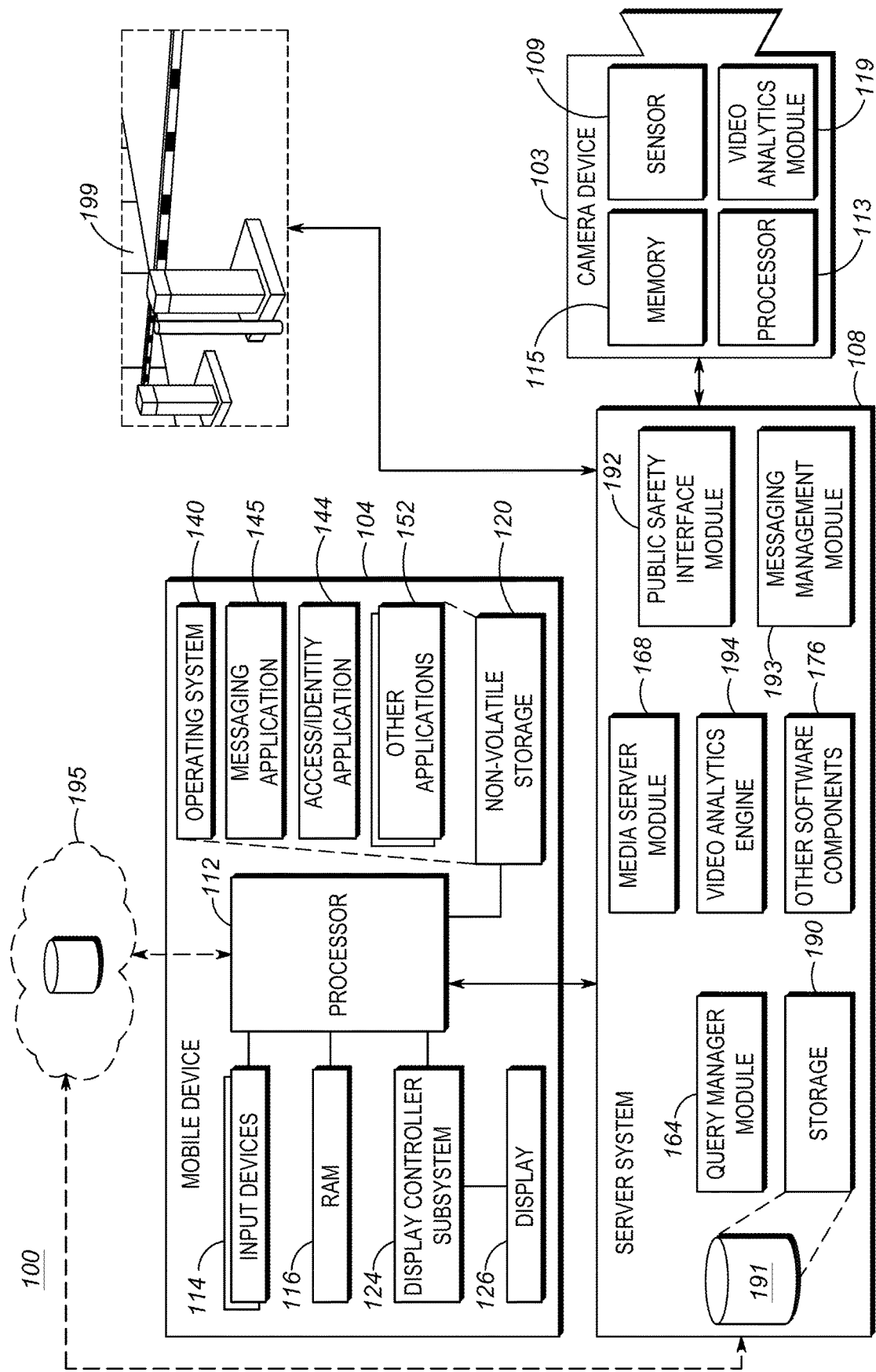
FIG. 1 is a block diagram of a system in accordance with example embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The system, apparatus, and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

In accordance with one example embodiment, there is provided a system installable within a parking facility. A fixed barrier structure is around at least a portion of a perimeter of the parking facility to facilitate restriction of vehicle exit and entry to an at least one location where a respective at least one access-controlled gate or door is installed. The system includes at least one processor communicatively couplable to the at least one access-controlled gate or door. The system also includes a camera communicatively couplable to the at least one processor. The camera is configured to capture at least one image showing license plate characters of a license plate of a vehicle. A Field Of View (FOV) of the camera is arranged to include coverage of an area that is inside the parking facility and along a path leading to the at least one access-controlled gate or door. The system also includes at least one electronic storage medium storing program instructions that when executed by the at least one processor cause the at least one processor to perform receiving a mobile device message wirelessly sent to notify of a potential or actual theft of the vehicle. The mobile device message includes at least an identifier corresponding to the vehicle. The identifier is the license plate characters or some other identifier from which the license plate characters can be obtained via lookup. Execution of the program instructions further causes the at least one processor to perform determining, based on analytics carried out on the license plate shown in the at least one image, that the vehicle has been driving along the path towards the at least one access-controlled gate or door where exiting of the vehicle can be blocked by the at least one access-controlled gate or door. Execution of the program instructions further causes the at least one processor to perform, after the receiving of the mobile device message, blocking exit of the vehicle from the parking facility in response to the mobile device message.

In accordance with another example embodiment, there is provided a method that includes receiving, at an at least one processor, a mobile device message wirelessly sent to notify of a potential or actual theft of a vehicle. The mobile device message includes at least an identifier corresponding to the vehicle. The identifier is license plate characters of a license plate of the vehicle, or some other identifier from which the license plate characters can be obtained via lookup. The method also includes operating a camera to capture at least one image showing the license plate characters. The method also includes employing the at least one processor to determine, based on analytics carried out on the license plate shown in the at least one image, that the vehicle has been driving along a path leading to an access-controlled gate or door where the vehicle can be blocked, by the access-controlled gate or door, from exiting a parking facility. A fixed barrier structure around at least a portion of a perimeter of the parking facility facilitates restriction of vehicle exit and entry. The method also includes blocking vehicle exit from the parking facility, after the receiving of the mobile device message (and in response to the mobile device message). A Field Of View (FOV) of the operated camera is arranged to include coverage of an area that is inside the parking facility and along the path leading to the access-controlled gate or door. Each of the above-mentioned embodiments will be discussed in more detail below, starting with example system and device architectures of the system in which the embodiments may be practiced, followed by an illustration of processing blocks for achieving an improved technical method, device, and system for responding to a potential or actual vehicle theft.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block(s).

The computer program instructions may also be loaded onto a computer or other programmable data processing apparatus that may be on or off-premises, or may be accessed via the cloud in any of a Software as a Service (SaaS), Platform as a Service (PaaS), or Infrastructure as a Service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the figures.

Referring now to the drawings, and in particular FIG. 1 which is a block diagram of an example system 100 within which methods in accordance with example embodiments can be carried out. Included within the illustrated system 100 are one or more mobile devices 104 and a server system 108. The one or more mobile devices 104 may be a selected one or more of the following: a handheld device such as, for example, a tablet, a phablet, a smart phone or a personal digital assistant (PDA); a laptop computer; and other suitable mobile devices. With respect to the server system 108, this could comprise a single physical machine or multiple physical machines. Additionally, it will be understood that the server system 108 need not be contained within a single chassis, nor necessarily will there be a single location for the server system 108. As will be appreciated by those skilled in the art, at least some of the functionality of the server system 108 can be implemented within the mobile device 104 rather than within the server system 108.

The mobile device 104 communicates with the server system 108 through one or more networks. These networks can include the Internet, or one or more other public/private networks coupled together by network switches or other communication elements. As an example and not by way of limitation, the mobile device 104 can communicate with an ad-hoc network, a Personal Area Network (PAN), a Local Area Network (LAN), a Wide Area Network (WAN), a Metropolitan Area Network (MAN), or one or more portions of the Internet or a combination of two or more of these. One or more portions of one or more of these networks may be wireless. As an example, the mobile device 104 may be capable of communicating with a Wireless PAN (WPAN) (such as, for example, a BLUETOOTH WPAN), a WI-FI network, a WI-MAX network, an LTE network, an LTE-A network, a cellular telephone network (such as, for example, a Global System for Mobile Communications (GSM) network), or any other suitable wireless network or a combination of two or more of these.

The mobile device 104 includes at least one processor 112 that controls the overall operation of the mobile device. The processor 112 interacts with various subsystems such as, for example, input devices 114 (such as, for example, a selected one or more of a virtual keyboard, touch pad, roller ball, integrated camera, integrated microphone, etcetera), random access memory (RAM) 116, non-volatile storage 120, display controller subsystem 124 and other subsystems. The display controller subsystem 124 interacts with display screen 126 and it renders graphics and/or text upon the display screen 126.

Still with reference to the mobile device 104 of the system 100, operating system 140 and various software applications used by the processor 112 are stored in the non-volatile storage 120. The non-volatile storage 120 is, for example, one or more hard disks, solid state drives, or some other suitable form of computer readable medium that retains recorded information after the mobile device 104 is turned off. Regarding the operating system 140, this includes software that manages computer hardware and software resources of the mobile device 104 and provides common services for computer programs. Also, those skilled in the art will appreciate that the operating system 140, access/identity application 144, messaging application 145, and other applications 152, or parts thereof, may be temporarily loaded into a volatile store (such as the RAM 116). The processor 112, in addition to its operating system functions, can enable execution of the various software applications on the mobile device 104.

Regarding the access/identity application 144, this can be run on the mobile device 104 and is used in connection with the providing of physical access control credentials of the user of the mobile device 104 to an access control reader (for example, an access control reader located at the location of access-controlled gate or door 199). The specific details regarding how the access/identity application 144 may communicate with an access control reader will be understood by those skilled in the art and, depending on the desired choice of implementation, may involve QR codes, Bluetooth™ Low Energy communication, or some other suitable mechanism consistent with example embodiments. Alternatives to the access/identity application 144 are contemplated. For example, a transponder attached to a vehicle's windshield is one alternative amongst others.

Regarding the messaging application 145, this may be a widely distributed application like Gmail™, Signal™, etcetera, or alternatively it may be a specialized messaging application customized for the customers and/or employees of the private enterprise that park in (or otherwise use) the parking facility equipped with the system 100. In at least one example, the messaging application 145 is an emergency-focused application intended to be used primarily in situations where urgent help or assistance is needed; however it is also contemplated that in other examples the messaging application 145 may be designed to be primarily operated for non-emergency use (while still also being compatible with emergency use).

Still with reference to FIG. 1, the server system 108 includes several software components for carrying out other functions of the server system 108. For example, the server system 108 includes a media server module 168. The media server module 168 handles requests related to storage, retrieval and formatting of security video and security images captured by an at least one camera device 103 (camera 103) in the system 100. The server system 108 also includes a video analytics engine 194. The video analytics engine 194 can, in some examples, be any suitable one of known commercially available software that carry out, as understood by a person of skill in the art, computer vision related functions (complementary to any video analytics performed within the housing of the security camera itself, which is sometimes referred to as analytics at the edge). Also, those skilled in the art will appreciate that, in some instances, the video analytics engine may be programmed with a detection classifier that evaluates a received video stream (for example, an image or part of an image of the video stream captured by the camera device 103) to determine if an instance of an object of interest that is defined in the detection classifier is detected or not from the evaluated video stream. Moreover, and as those skilled in the art will appreciate, in the case where machine learning (such as for example, neural network technology) is employed in detection and classification, percentage confidences can be generated in relation to likelihoods of detections and classifications.

Continuing on, the server system 108 also optionally includes a public safety interface module 192 and a messaging management module 193. The public safety interface module 192 enables a service for real-time information sharing as between at least one private enterprise and at least one public safety entity. Additional details regarding the public safety interface module 192 are later herein described. The messaging management module 193 manages secure message communications amongst, for example, customers and/or employees of the private enterprise that park in (or otherwise use) the parking facility equipped with the system 100. Additional details regarding the messaging management module 193 are later herein described.

The server system 108 also includes a number of other software components 176. These other software components will vary depending on the requirements of the server system 108 within the overall system. As one example, the other software components 176 might include special test and debugging software, or software to facilitate version updating of modules within the server system 108.

Regarding the data store 190, this comprises, for example, one or more databases 191 which may facilitate the organized storing of recorded security video, non-video sensor data, physical access control data, etcetera in accordance with example embodiments. The one or more databases 191 may also contain metadata related to, for example, the recorded security video that is storable within the one or more data stores 190. Examples of metadata that may be expected to be derived directly or indirectly from video data include location in field of view, object ID, bounding box-related data, tracking position relative to field of view, etc. Management of data within the one or more databases 191 may be facilitated by a query manager module 164 (further details of this module are later herein described).

Optionally, the system 100 may include connections to the illustrated one or more cloud services 195. For example, the mobile device 104 may be connected to the cloud service(s) 195 by the Internet and/or one or more wireless and/or wired wide area networks (examples of which were previously herein detailed). Similarly, the server system 108 may be connected to the cloud service(s) 195 by the Internet and/or one or more wireless and/or wired wide area networks (examples of which were previously herein detailed). It will be understood that some example embodiments may include the cloud service(s) 195 which may include storage and/or run software modules complementary to (or in addition to) those provided by the server system 108 within the system 100.

The illustrated system 100 includes the at least one camera device 103 being operable to capture a plurality of images and produce image data representing the plurality of captured images. The illustrated camera 103 is an image capturing device (as well as a security camera). Furthermore, although only one camera device is shown in FIG. 1, it will be understood that the system 100 may include any suitable number of cameras.

The camera 103 includes an image sensor 109 for capturing a plurality of images. The camera 103 may be a digital video camera and the image sensor 109 may output captured light as a digital data. For example, the image sensor 109 may be a CMOS, NMOS, or CCD. In some embodiments, the camera 103 may be an analog camera connected to an encoder. The illustrated camera 103 may be a 2D camera; however use of a 3D camera, a stereo camera, or any other suitable type of camera within the system 100 is contemplated.

The image sensor 109 may be operable to capture light in one or more frequency ranges. For example, the image sensor 109 may be operable to capture light in a range that substantially corresponds to the visible light frequency range. In other examples, the image sensor 109 may be operable to capture light outside the visible light range, such as in the infrared (IR) and/or ultraviolet range. In other examples, the camera 103 may be a "multi-sensor" type of camera, such that the camera 103 includes at least one set of two or more sensors that are operable to capture light in different and/or same frequency ranges.

The camera 103 may be a dedicated camera. It will be understood that a dedicated camera herein refers to a camera whose principal features is to capture images or video. In some example embodiments, the dedicated camera may perform functions associated with the captured images or video, such as but not limited to processing the image data produced by it or by another camera. For example, the dedicated camera may be a security camera, such as any one of a Pan-Tilt-Zoom (PTZ) camera, dome camera, in-ceiling camera, box camera, and bullet camera.

The camera 103 includes one or more processors 113, one or more video analytics modules 119, and one or more memory devices 115 coupled to the processors and one or more network interfaces. Regarding the video analytics module 119, this generates metadata outputted to the server system 108. The metadata can include, for example, records which describe various detections of objects such as, for instance, pixel locations for the detected object in respect of a first record and a last record for the camera within which the respective metadata is being generated.

In addition to the above-described details regarding the video analytics module 119, this module may optionally play an important role in object tracking. For example, after the receipt of a potential/actual theft message within the server system 108, the server system may optionally communicate with the camera 103, and responsively the video analytics module 119 of the camera 103 may detect and recognize an actually or potentially stolen vehicle and responsively initiate automatic object tracking of: i) the actually or potentially stolen vehicle; or ii) a suspect escaping on foot after he or she abandons the actually or potentially stolen vehicle.

Regarding the memory device 115, this can include a local memory (such as, for example, a RAM and a cache memory) employed during execution of program instructions. Regarding the processor 113, this executes computer program instructions (such as, for example, an operating system and/or software programs), which can be stored in the memory device 115.

In various embodiments the processor 113 may be implemented by any suitable processing circuit having one or more circuit units, including a digital signal processor (DSP), graphics processing unit (GPU) embedded processor, a visual processing unit or a vision processing unit (both referred to herein as "VPU"), etc., and any suitable combination thereof operating independently or in parallel, including possibly operating redundantly. Such processing circuit may be implemented by one or more integrated circuits, including being implemented by a monolithic integrated circuit (MIC), an Application Specific Integrated Circuit (ASIC), a Field Programmable Gate Array (FPGA), etc. or any suitable combination thereof. Additionally or alternatively, such processing circuit may be implemented as a programmable logic controller (PLC), for example. The processor may include circuitry for storing memory, such as digital data, and may comprise the memory circuit or be in wired communication with the memory circuit, for example. A system on a chip (SOC) implementation is also common, where a plurality of the components of the camera 103, including the processor 113, may be combined together on one semiconductor chip. For example, the processor 113, the memory device 115 and the network interface of the camera 103 may be implemented within a SOC. Furthermore, when implemented in this way, a general purpose processor and one or more of a GPU or VPU, and a DSP may be implemented together within the SOC.

In various example embodiments, the memory device 115 coupled to the processor 113 is operable to store data and computer program instructions. The memory device 115 may be implemented as Read-Only Memory (ROM), Programmable Read-Only Memory (PROM), Erasable Programmable Read-Only Memory (EPROM), Electrically Erasable Programmable Read-Only Memory (EEPROM), flash memory, one or more flash drives, universal serial bus (USB) connected memory units, magnetic storage, optical storage, magneto-optical storage, etc. or any combination thereof, for example. The memory device 115 may be operable to store memory as volatile memory, non-volatile memory, dynamic memory, etc. or any combination thereof.

Still with reference to FIG. 1, the camera 103 and the access-controlled gate or door 199 are coupled to the server system 108. In some examples, each of these is coupled to the server system 108 via one or more suitable networks. These networks can include the Internet, or one or more other public/private networks coupled together by network switches or other communication elements. The network(s) could be of the form of, for example, client-server networks, peer-to-peer networks, etc. Data connections between the camera 103 and the server system 108 (as well as the access-controlled gate or door 199 and the server 108) can be any number of known arrangements, examples of which were previously herein detailed. In at least one example embodiment, the access-controlled gate or door 199, the camera 103 and the server system 108 are within the same Local Area Network (LAN). In some examples, the camera 103 (as well as the access-controlled gate or door 199) may be coupled to the server system 108 in a more direct manner than as described above.

Although the system 100 illustrated in FIG. 1 only explicitly shows a camera device coupled to the server system 108, it will be understood that the system 100 is not limited in contemplated compositions to just camera device(s). For instance, the system 100 might include, in one example, a heterogeneous mixture of both image sensor device(s) and non-image sensor device(s) coupled to the server system 108.

Figure 2:
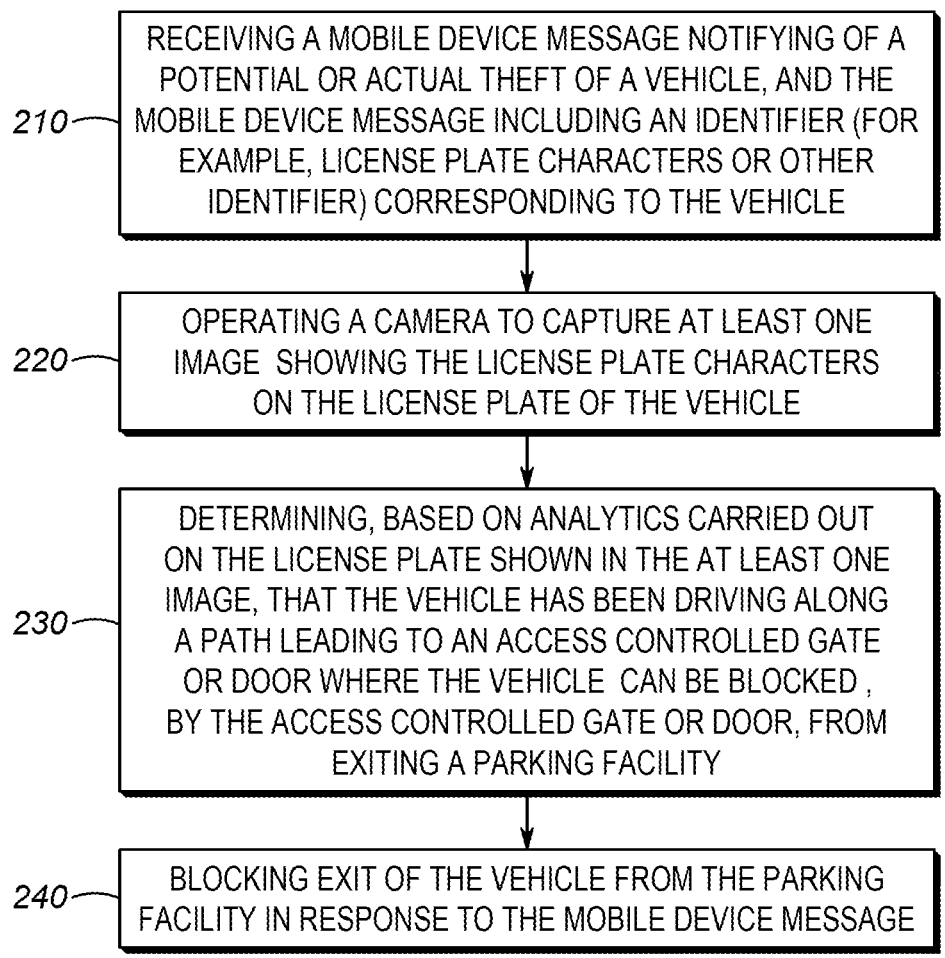
FIG. 2 is a flow chart illustrating a method in accordance with an example embodiment.
Figure 3:
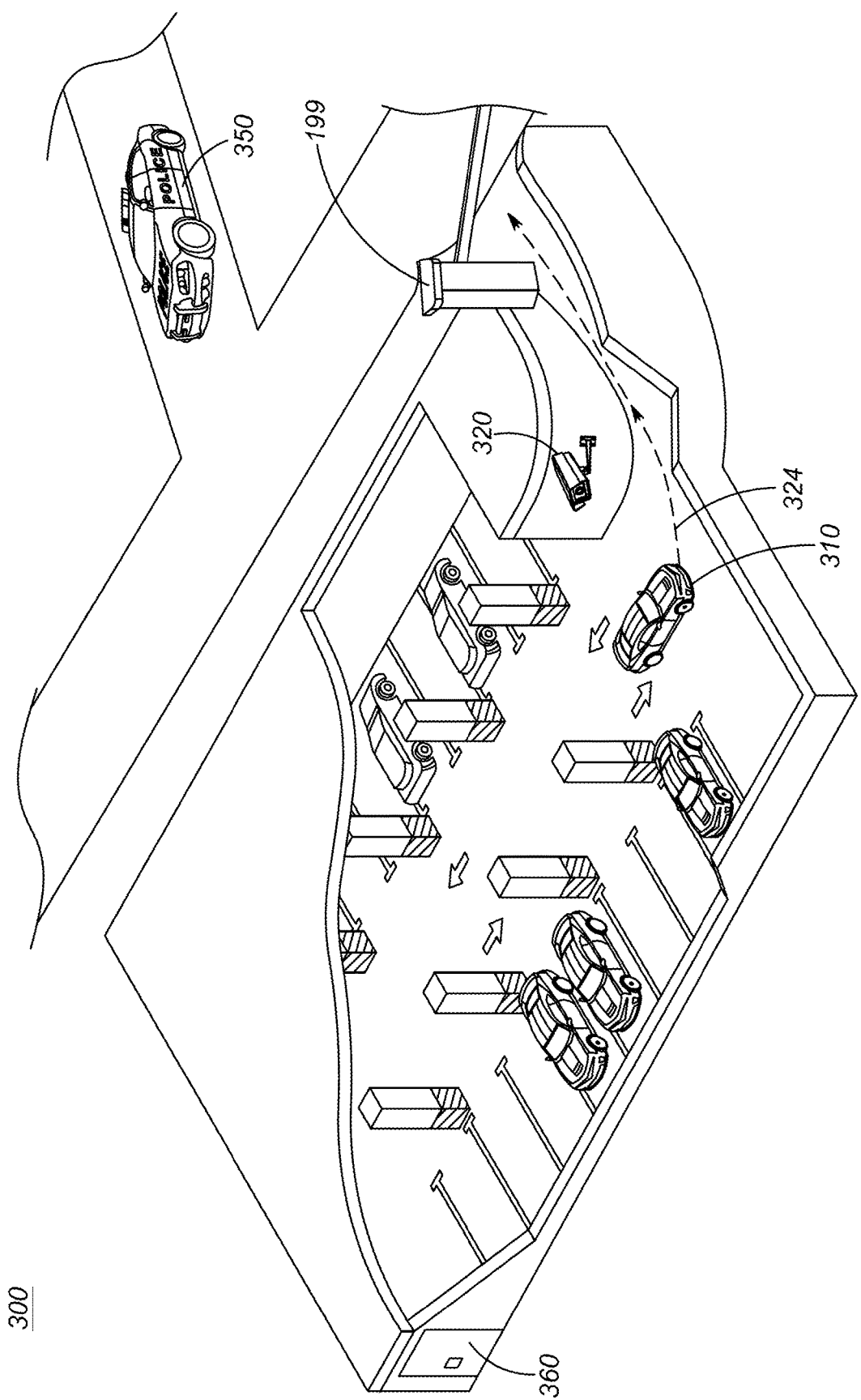
FIG. 3 is a diagram of an example parking facility within which the method of FIG. 2 may be carried out.

Reference is now made to FIGS. 2 and 3. FIG. 2 is a flow chart illustrating a method 200 in accordance with an example embodiment. FIG. 3 is a diagram of an example parking facility 300 within which the method of FIG. 2 may be carried out.

Firstly, in respect of the method 200 of FIG. 2, a mobile device message (wirelessly sent) is received (210). For example, this message may by received by an at least one processor within the server system 108 (FIG. 1). The mobile device message is notifying of a potential or actual theft of a vehicle (for example, a car 310 shown in FIG. 3) and includes at least an identifier corresponding to the vehicle. This identifier may be license plate characters of a license plate of the vehicle, or some other identifier from which the license plate characters can be obtained via lookup.

In addition to the identifier corresponding to the vehicle, it is contemplated that the mobile device message includes other data and/or attachments. For example, the mobile device message may optionally further include a face reference image of a legitimate driver of the vehicle, and the video analytics engine 194 may be caused to perform a facial recognition as between the face reference image and an unknown face image, captured contemporaneous with the vehicle approaching the access-controlled gate or door 199, to confirm that the vehicle is not being driven by the legitimate driver (and to continue to block exit of the vehicle from the area in a manner as described herein later in more detail). As another example, the mobile device message may optionally further include location data of a legitimate driver of the vehicle, and the query manager module 164 of the server system 108 may cooperate with other parts of the system 100 in determining a mismatch between a location of an access control exit attempt and a recorded location of the legitimate driver obtained from the location data.

Continuing on in relation to the method 200 illustrated in FIG. 2, a camera 320 (which may be, for example, the same as the camera 103 of FIG. 1) is operated (220) to capture at least one image showing the license plate characters of a license plate of the car 310. A Field Of View (FOV) of the operated camera 320 is arranged to include coverage of an area that is inside a parking facility and along a path 324 leading to the access-controlled gate or door 199.

Next in the method 200, it is determined (230) that the vehicle (which is the car 310 in the illustrated example) has been driving along the path 324 leading to the access-controlled gate or door 199, where the vehicle can be blocked from exiting a parking facility. The action 230 may be based on analytics carried out on the license plate shown in the at least one image. The parking facility includes a fixed barrier structure around at least a portion of a perimeter of the parking facility, facilitating restriction of vehicle exit and entry. In the illustrated example, this fixed barrier structure is comprised of a plurality of cement walls; however in other examples the fixed barrier structure may be something else, like security fencing.

Finally in the method 200, exit (i.e. exit from the parking facility) of the vehicle (which is the car 310 in the illustrated example) is blocked (240) in response to the mobile device message. Optionally (and later or contemporaneous with the action 240) a mass notification message, destined to at least some parking tenants of the parking facility 300, may be generated by the messaging management module 193. Such a mass notification message would be providing details of the potential or actual theft of the car 310. In the case of a carjacking, it is contemplated that the mass notification message may optionally include a specific identification of the event as a carjacking (i.e. instead of a more general "vehicle theft" identification) and may also include a warning to not enter the parking facility 300. In at least one example, and contemporaneous with the mass messaging, non-vehicle entry/exit points for the parking facility 300 may be secured. For instance, a human-sized entry/exit door 360 might be changed from an open-by-default state to a locked-by-default state.

It is also contemplated that the above-described mass messaging may take the form of more than just a once in time messaging activity for any particular actual/potential theft event. For instance, it is contemplated that the messaging management module 193 may be caused to selectively identify, after the initial mass notification message has been sent to the at least some parking tenants, new message recipients to receive the mass notification message based on actual or attempted new entries into the parking facility 300.

Also, in at least one example embodiment, the public safety interface module 192 (FIG. 1) may be employed cooperatively with the media server module 168 to generate at least one emergency message, for transmission to the at least one public safety entity (for example, police agency), and the emergency message may include one or more images (and/or one or more video clips) captured by the camera 320 within which the car 310 is shown. In addition to attached image(s)/video, the emergency message may optionally further include time-stamped location details of the car 310.

Additional emergency message(s) beyond the above-described emergency message are contemplated. As an example of an additional emergency message for transmission to the at least one public safety entity, time details (as well as location details) in relation to an attempt to block the car 310 from exit at the access-controlled gate or door 199 may be communicated. Such an additional emergency message may also optionally include additional details as to success, or lack thereof, of the attempt to block the car 310 from exit at the access-controlled gate or door 199.

It is contemplated that any emergency messages received by the public safety entity may be further communicated (in whole or in part) to active vehicles of the public safety entity. In FIG. 3, a police car 350 is one such vehicle.

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etcetera, and cannot block a vehicle from exiting a parking facility, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

Also, it should be understood that the illustrated components, unless explicitly described to the contrary, may be combined or divided into separate software, firmware, and/or hardware. For example, instead of being located within and performed by a single electronic processor, logic and processing described herein may be distributed among multiple electronic processors. Similarly, one or more memory modules and communication channels or networks may be used even if embodiments described or illustrated herein have a single such device or element. Also, regardless of how they are combined or divided, hardware and software components may be located on the same computing device or may be distributed among multiple different devices. Accordingly, in this description and in the claims, if an apparatus, method, or system is claimed, for example, as including a controller, control unit, electronic processor, computing device, logic element, module, memory module, communication channel or network, or other element configured in a certain manner, for example, to perform multiple functions, the claim or claim element should be interpreted as meaning one or more of such elements where any one of the one or more elements is configured as claimed, for example, to make any one or more of the recited multiple functions, such that the one or more elements, as a set, perform the multiple functions collectively.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system installable within a parking facility that includes a fixed barrier structure around at least a portion of a perimeter of the parking facility to facilitate restriction of vehicle exit and entry to an at least one location where a respective at least one access-controlled gate or door is installed, the system comprising:
   at least one processor communicatively couplable to the at least one access-controlled gate or door;
   a camera communicatively couplable to the at least one processor, and the camera being configured to capture at least one image showing license plate characters of a license plate of a vehicle, and wherein a Field Of View (FOV) of the camera is arranged to include coverage of an area that is inside the parking facility and along a path leading to the at least one access-controlled gate or door; and
   at least one electronic storage medium storing program instructions that when executed by the at least one processor cause the at least one processor to perform:
      receiving a mobile device message wirelessly sent to notify of a potential or actual theft of the vehicle, and the mobile device message including at least an identifier corresponding to the vehicle, the identifier being the license plate characters or some other identifier from which the license plate characters can be obtained via lookup;
      determining, based on analytics carried out on the license plate shown in the at least one image, that the vehicle has been driving along the path towards the at least one access-controlled gate or door where exiting of the vehicle can be blocked by the at least one access-controlled gate or door; and
      after the receiving of the mobile device message, blocking exit of the vehicle from the parking facility in response to the mobile device message.

2. The system of claim 1 wherein the at least one electronic storage medium stores additional program instructions of a service for real-time information sharing as between at least one private enterprise and at least one public safety entity, and wherein the additional program instructions when executed by the at least one processor cause the at least one processor to perform generating of at least one emergency message, for transmission to the at least one public safety entity, and the at least one emergency message including one or more images captured by the camera within which the vehicle is shown.

3. The system of claim 2 wherein the at least one emergency message further includes time-stamped location details of the vehicle.

4. The system of claim 2 wherein the at least one processor is further caused to perform generating an additional emergency message for transmission to the at least one public safety entity, and the additional emergency message including at least one of time details and location details in relation to an attempt to block the vehicle from exit at the at least one access-controlled gate or door.

5. The system of claim 4 wherein the additional emergency message includes additional details as to success, or lack thereof, of the attempt to block the vehicle from exit at the at least one access-controlled gate or door.

6. The system of claim 1 wherein the mobile device message further includes a face reference image of a legitimate driver of the vehicle, and the at least one processor is further caused to perform a facial recognition as between the face reference image and an unknown face image, captured contemporaneous with the vehicle approaching the at least one access-controlled gate or door, to confirm that the vehicle is not being driven by the legitimate driver and to continue to block exit of the vehicle from the area.

7. The system of claim 1 wherein the mobile device message further includes location data of a legitimate driver of the vehicle, and wherein the at least one processor is further caused to perform determining a mismatch between a location of an access control exit attempt and a recorded location of the legitimate driver obtained from the location data.

8. The system of claim 1 wherein the at least one processor is further caused to generate, after the blocking of exit of the vehicle, a mass notification message destined to at least some parking tenants of the parking facility providing details of the potential or actual theft of the vehicle.

9. The system of claim 8 wherein the at least one processor is further caused to selectively identify, after the mass notification message has been sent to the at least some parking tenants, new message recipients to receive the mass notification message, that provides the details of the potential or actual theft of the vehicle in the parking facility, based on actual or attempted new entries into the parking facility.

10. The system of claim 8 wherein the details provided in the mass notification message include identifying the potential or actual theft of the vehicle as a carjacking, and also includes a warning to not enter the parking facility.

11. The system of claim 1 wherein the at least one processor is further caused to initiate automatic object tracking of: i) the vehicle; or ii) a suspect escaping on foot after abandoning the vehicle, directly or indirectly in response to video analytics running on the camera detecting and recognizing the vehicle after the receiving of the mobile device message.

12. A method comprising:
receiving, at an at least one processor, a mobile device message wirelessly sent to notify of a potential or actual theft of a vehicle, and the mobile device message including at least an identifier corresponding to the vehicle, the identifier being license plate characters of a license plate of the vehicle, or some other identifier from which the license plate characters can be obtained via lookup;
operating a camera to capture at least one image showing the license plate characters;
employing the at least one processor to determine, based on analytics carried out on the license plate shown in the at least one image, that the vehicle has been driving along a path leading to an access-controlled gate or door where the vehicle can be blocked, by the access-controlled gate or door, from exiting a parking facility that includes a fixed barrier structure around at least a portion of a perimeter of the parking facility, facilitating restriction of vehicle exit and entry; and
after the receiving of the mobile device message, blocking exit of the vehicle from the parking facility in response to the mobile device message,
wherein a Field Of View (FOV) of the operated camera is arranged to include coverage of an area that is inside the parking facility and along the path leading to the access-controlled gate or door.

13. The method of claim 12 further comprising generating an at least one emergency message, for transmission to an at least one public safety entity, and the at least one emergency message including one or more images captured by the camera within which the vehicle is shown.

14. The method of claim 13 wherein the at least one emergency message further includes time-stamped location details of the vehicle.

15. The method of claim 13 further comprising generating an additional emergency message for transmission to the at least one public safety entity, and the additional emergency message including at least one of time details and location details in relation to an attempt to block the vehicle from exit at the access-controlled gate or door.

16. The method of claim 15 wherein the additional emergency message includes additional details as to success, or lack thereof, of the attempt to block the vehicle from exit at the access-controlled gate or door.

17. The method of claim 12 further comprising generating, after the blocking of exit of the vehicle, a mass notification message destined to at least some parking tenants of the parking facility providing details of the potential or actual theft of the vehicle.

18. The method of claim 12 further comprising initiating automatic object tracking of: i) the vehicle; or ii) a suspect escaping on foot after abandoning the vehicle, directly or indirectly in response to video analytics running on the camera detecting and recognizing the vehicle after the receiving of the mobile device message.

\* \* \* \* \*